(12) United States Patent
Paz-Pujalt et al.

(10) Patent No.: US 6,798,531 B1
(45) Date of Patent: Sep. 28, 2004

(54) PRINTING AND DELIVERY OF DIGITAL IMAGES AND TEXT VIA A CENTRAL RECEIVING AGENCY

(75) Inventors: Gustavo R. Paz-Pujalt, Rochester, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/416,697

(22) Filed: Oct. 12, 1999

(51) Int. Cl.[7] .............................................. G06K 15/12
(52) U.S. Cl. ..................................... 358/1.15; 358/302
(58) Field of Search ................. 358/1.1–1.9, 1.11–1.18, 358/450, 452, 302; 355/40; 399/137, 145; 709/200, 201, 217, 219, 229; 705/26, 27

(56) References Cited

U.S. PATENT DOCUMENTS

| | | | | |
|---|---|---|---|---|
| 5,666,215 A | * | 9/1997 | Fredlund et al. | ............ 358/487 |
| 5,799,219 A | | 8/1998 | Moghadam et al. | ........ 358/487 |
| 5,974,401 A | | 10/1999 | Enomoto et al. | ............. 705/40 |
| 6,324,521 B1 | * | 11/2001 | Shiota et al. | ................. 705/27 |
| 6,512,570 B2 | * | 1/2003 | Garfinkle et al. | ............. 355/40 |

FOREIGN PATENT DOCUMENTS

| | | |
|---|---|---|
| EP | 0 858 207 | 8/1998 |
| EP | 0 860 980 | 8/1998 |
| JP | 10-78618 | 3/1998 |

* cited by examiner

Primary Examiner—King Y. Poon
(74) Attorney, Agent, or Firm—Raymond L. Owens

(57) ABSTRACT

A method of delivering printed images to a recipient, includes the steps of electronically transmitting digital images and image locator information from a location remote from and over a communication channel to a central receiving agency which stores such images and locator information in memory; and identifying a particular stored image in the memory using the corresponding image locator information and the location of one or more recipients and printing locations corresponding to each of the recipients. The method further includes transmitting the identified particular stored image in the memory to the printing location of each of the recipients; and printing the image at the printing location of each of the recipients and delivering the printed image to the location corresponding to of each of the recipients.

5 Claims, 5 Drawing Sheets

PRINTING AND DELIVERY OF DIGITAL IMAGES AND TEXT VIA A CENTRAL RECEIVING AGENCY

CROSS REFERENCE TO RELATED APPLICATIONS

Reference is made to commonly assigned U.S. patent application Ser. No. 09/359,152 filed Jul. 22, 1999, entitled "Authorizing the Printing of Digital Images", by David L. Patton et al and U.S. patent application Ser. No. 09/378,159 filed Aug. 19, 1999, entitled "System for Customizing and Ordering Personalized Postage Stamps" by David L. Patton et al, the disclosures of which are incorporated herein.

FIELD OF THE INVENTION

This invention relates to electronically transmitting a digital image over a channel to a central receiving agency, which causes a hardcopy of the image to be delivered to the locations of different recipients.

BACKGROUND OF THE INVENTION

Commonly-assigned U.S. Pat. No. 5,666,215 discloses a method for viewing photographic images on a personal computer and enabling a user or consumer to select images for initial printing, reprinting and ordering related image products.

Photographic negatives often are provided to a scanner to obtain image data. The image data is manipulated to provide a positive image in the case of the photographic negatives and sent to the user's personal computer. The desired images are then selected and order information is provided, based on the positive image as displayed on the display of the personal computer. The order information is recorded to permit the desired prints and services to be created and the resulting order is sent to the location. The following can also be used as sources of images to be selected for prints and other services; image files stored in digital format on floppy disks, Picture CDs, Photo CDs, CD-ROMs, down loaded from the Internet, and negatives and prints scanned using a scanner and displayed on a personal computer's display.

The above cited patent and patent applications describe methods and systems by which a user or consumer can create or receive digital files of their images. Also described are how user or consumers can send these image files to a central receiving agency with authorization for these image files to be printed and various types of hardcopy products to be created.

These same user or consumers frequently use their personal computers to send images attached to e-mail messages to friends and relatives that also own personal computers that are connected to electronic communications systems such as the Internet. The problem is a majority of the people in the world does not own or have access to personal computers or have ready access to the Internet. Therefore they do not have the capability to receiver images electronically from friends and relatives who do. In some cases where user or consumers have Internet access at their place of employment they do not have the ability to print a color high quality image from the image file they receive.

SUMMARY OF THE INVENTION

It is an object of the present invention to provide an expeditious way of delivering printed images to recipients at one or more different locations.

It is a further object that the printed images can have text or graphic information.

These objects are achieved by a method of delivering printed images to a recipient, comprising the steps of:

a) electronically transmitting digital images and image locator information from a location remote from and over a communication channel to a central receiving agency which stores such images and locator information in memory;

b) identifying a particular stored image in the memory using the corresponding image locator information and the location of one or more recipients and printing locations corresponding to each of the recipients;

c) transmitting the identified particular stored image in the memory to the printing location of each of the recipients; and d) printing the image at the printing location of each of the recipients and delivering the printed image to the location corresponding to each of the recipients.

It is a feature of the present invention that images and text can be conveniently printed at remote printing locations where they can be delivered to desired recipients such as by mail or courier service. The user(s) or a third party such as an sponsor can conveniently be charged for the printing and delivery of the printed image to each of the recipients.

DETAILED DESCRIPTION OF THE PREFERRED EMBODIMENTS

Figure 1:
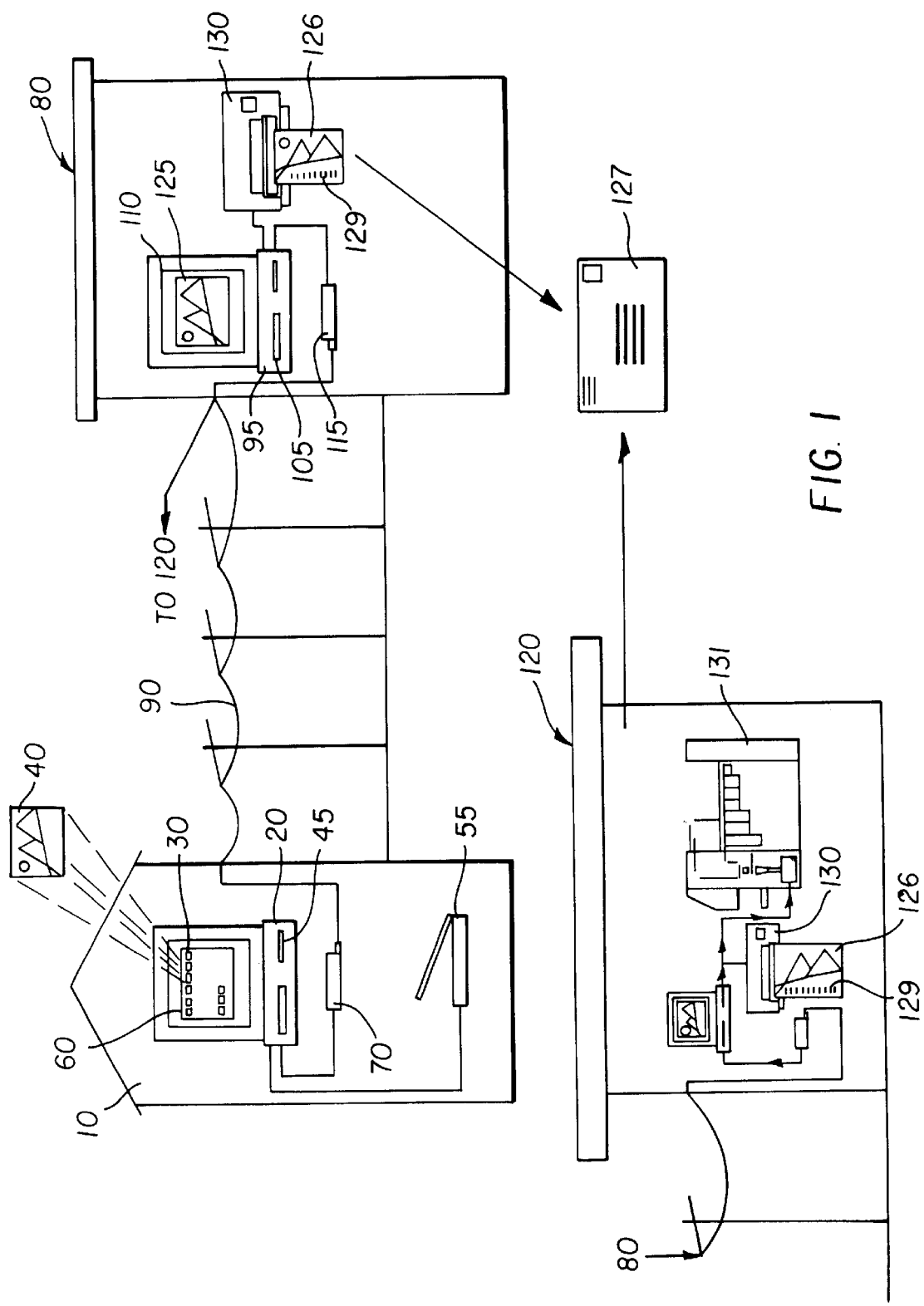
FIG. 1 is a block diagram of a system for remotely selecting images and transmitting the selected images to a central receiving agency where they can be delivered to a remote printing location for delivery of the images to the designated recipients at different locations.

Referring now to FIG. 1, there is illustrated a system for delivering printed images to one or more recipients. The images can be included in a digital file. The digital file also includes image locator information. The image locator information can be a name associated with the digital image. This name can be used by a central receiving agency 80 to sort the image file in a particular location for retrieval. More particularly a set of personal images 30 is viewed at a remote location 10 on a personal computer 20 or interactive TV (not shown) or any Internet-capable appliance or device (not shown). The source of the personal images 30 can be image files stored in digital format on floppy and hard disks, Picture CDs, Photo CDs, and CD-ROMs. The image files can also be down loaded from the Internet using a system such as Kodak's PhotoNet, or negatives and prints can be scanned using the user's own film scanner 45 or print scanner 55 and displayed on their personal computer's display 60. A selected image 40, text, image locator information and the location of the recipient are electronically transmitted as signals from the remote location 10 over a communication channel 90 to the central receiving agency 80 where the information is received and stored in memory 105. The transmitted user or consumer information is comprised of, but not limited to, the user's location, credit card number, user or consumer authorization, image locator information and number of prints, text and graphics to be printed and delivered to the location of one or more recipients. The user or consumer has the option of designating the size and quality level at which the prints are to be made and the type of media to be used to produce the printed image. The media can typically be paper, but can be as diverse as ceramic or plastic mugs or cloth or polymeric materials.

The digital file includes the locator of the selected image 40 and the user or consumer information are sent via a modem 70 to the central receiving agency 80 such as the U.S. Postal Service over the communication channel 90, such as the Internet. The central receiving agency 80 receives the image file and/or image locator information and user or consumer information via a modem 115, and using a central server 95 records, and stores the image file and/or image locator information and user or consumer information in memory 105. The central receiving agency 80 views the selected image 40 and user or consumer information on a monitor 110 and authorizes when identified by a user or consumer the printing of a modified image 125 with text and graphics at the central receiving agency 80 or at a particular local printing station 120. A user or consumer causes the electronic transmission of the digital images and locator information from a location remote from and over the communication channel 90 such as telephone lines into a memory location in the central receiving agency 80. A user or consumer can simultaneously at this time cause a stored image in memory using the corresponding image locator information and the location of one or more recipients to transmit these data to the printing location for each of the recipients. The images are printed at these locations and then delivered by mail or courier to each of the recipients. The identifying step can be simultaneously with or at a later time than the electronic transmitting step.

After receiving the image file including image locator information at the central receiving agency 80, the selected image 40 can be modified in such a way that the image is different from the original and the results are stored in memory 105 for future use. For example, but not by way of limitation, text or graphics may be added, or the color of the image, or a portion thereof, may be adjusted by cropping, enlarging or repositioning. The resulting modified image 125 is then stored in memory 105 and its location identified for future use. It will be understood by those skilled in the art that the image file before delivery to the central receiving agency can include text or graphics or other image modifications. The text or graphics can be printed on or with the image.

The central receiving agency 80 transmits the particular information to printing location 120 which corresponds to one or more recipients. The recipients can be listed on a distribution list provided by a personal computer 20 at the remote location 10. After the central receiving agency 80 has determine that a user is authorized to transmit images to one or more recipients, such images are transmitted to each printing location 120 for printing and delivery to the one or more recipients.

A hardcopy 126 of the image as modified including text or graphics 129 is now printed at each of the local printing stations 120. A hardcopy 126 of the modified image 125 and text or graphics 129 are packaged as designated by number 127 and delivered to each designated recipient. At the designated printing location 120, the hardcopy 126 of the image and text or graphics 129 are packaged as designated by number 127 and delivered to the location of the recipient via the mail or a courier service such as Federal Express or DHL. Because the user or consumer has the option of designating the size and quality of the hardcopy print 126 and the media type, a variety of digital printer choices are necessary. The hardcopy 126 of the image and text or graphics 129 can be printed using a thermal printer 130 such as a KODAK PS 8650 Color Printer or a KODAK Photo Printer 4700 or a minilab 131. Other types of digital printers such as a KODAK CRT Digital Color Printer, a Hewlett Packard Deskjet 870Cix Inkjet Printer, or a digital electrophotographic printer such as an Indigo-E-1000 can be used to produce the hard copy 126.

Figure 2:
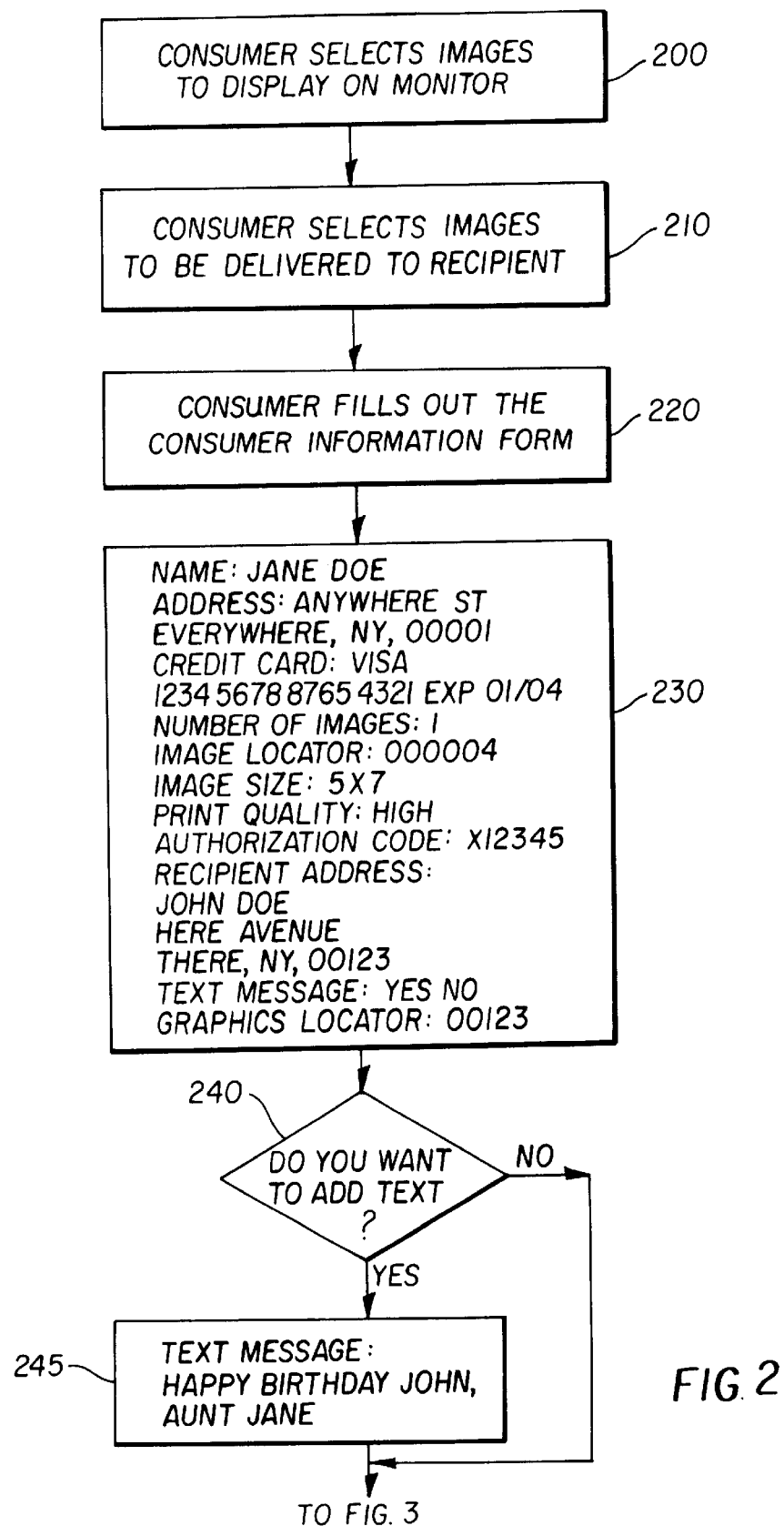
FIG. 2 is a flow chart showing how a user or consumer selects an image, an image locator and completes a user or consumer information form.

Now referring to FIG. 2 there is provided a flow chart showing how a user or consumer selects an image, an image locator and transmits them over a communication channel to the central receiving agency. The user or consumer selects the images from their image files to be displayed 200. The user or consumer selects 210 the selected image 40 to be delivered to the recipient from the images displayed on the computer display 60. The user or consumer then fills out 220 the user or consumer information form 230. The user or consumer information form 230 contains but is not limited to the user's address, credit card number, image locator information 232, user or consumer authorization code 235, the quality, size and number of prints, the media type and the address of the recipient or recipients. The user or consumer can also specify whether text and graphics 129 is to be added to the selected image 40 before the selected image 40 is delivered to the recipient. The central receiving agency 80 uses the image locator information 232 and authorization code 235 to access the selected image 40 for printing. The image locator information 232 can be a name associated with the digital image. This name can be used by the central receiving agency 80 to sort the image file in a particular location for retrieval. The authorization code 235 can be linked to the user's credit card number similarly to the way a pin number is linked to a credit card and is well known in the art. The linking of the authorization code 235 to the user's credit card number can be done for added security but is not necessary. The central receiving agency 80 can use the authorization code 235 as a customer order number. The central receiving agency 80 can also use the authorization code 235 to inform the user or consumer the selected image 40 was approved and sent to the designated recipient. The user or consumer can add text 240 to the selected image 40. If the user or consumer decides to add a text message 245, the user or consumer types the text message which becomes part of the user or consumer information form 230. After the user or consumer decides to add or not to add a text message 245, the user or consumer can decide to add graphics. Now referring to FIG. 3, which flows from FIG. 2, the user or consumer can add graphics to a selected image 250. If the user or consumer decides to add graphics, the user or consumer provides a graphics locator information 255. The graphics locator information 255 can be a name associated with the graphic. The central receiving agency 80 can use the graphics locator information 255 to sort a graphics file in a particular location for retrieval. The user or consumer can decide not to add graphics locator information 255. After deciding to add or not to add graphics, the user or consumer prepares to transmit the order. After the user or consumer has selected an image, text and graphics, and completed the information form 230, the user or consumer transmits 260 the selected image locator information 232, text and graphics locator information 255, and user or consumer information form 230 to the central receiving agency 80. The central receiving agency 80 receives 265 the selected image locator information 232, text and graphics locator information 255, and user or consumer information form 230 and stores 270 the received items in memory 105.

Figure 3:
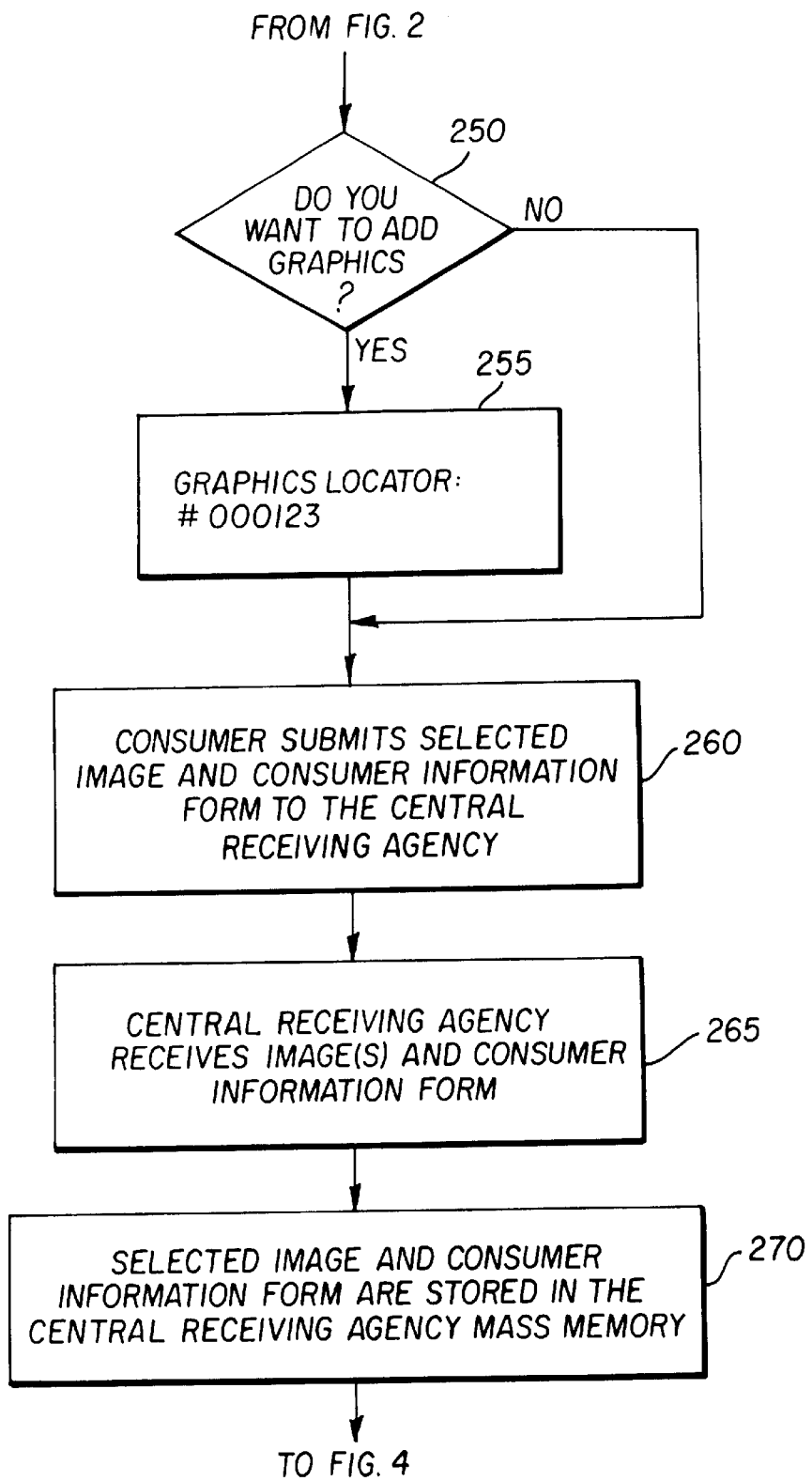
FIG. 3 is a flow chart continuing the flow chart of FIG. 2 showing how selected images and user or consumer information form are sent to the central receiving agency.
Figure 4:
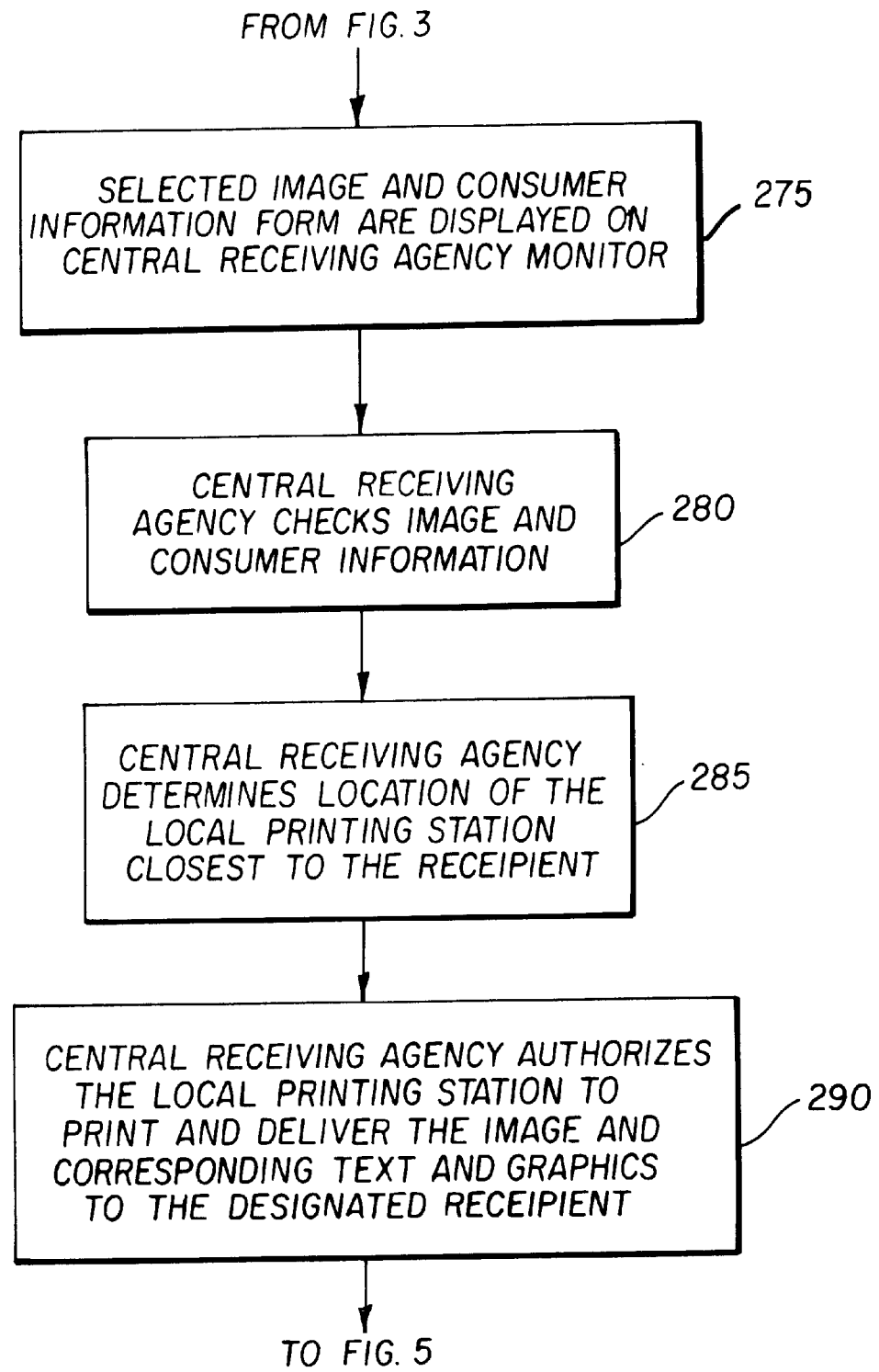
FIG. 4 is a flow chart continuing the flow chart of FIG. 3 showing how selected images are authorized by the central receiving agency and sent to a local printing station.

Now referring FIG. 4, which continues the flow chart of FIG. 3 and shows how selected image 40, text and graphics 129 and user or consumer information form 230 are displayed 275 on a monitor 110 at the central receiving agency 80, and checked 280. The central receiving agency 80 determines 285 the location of the local printing station 120 closest to the designated recipient and authorizes the local printing station 120 to print 290 the selected image 40 and text and graphics 129 and deliver a hardcopy 126 to the designated recipient.

Figure 5:
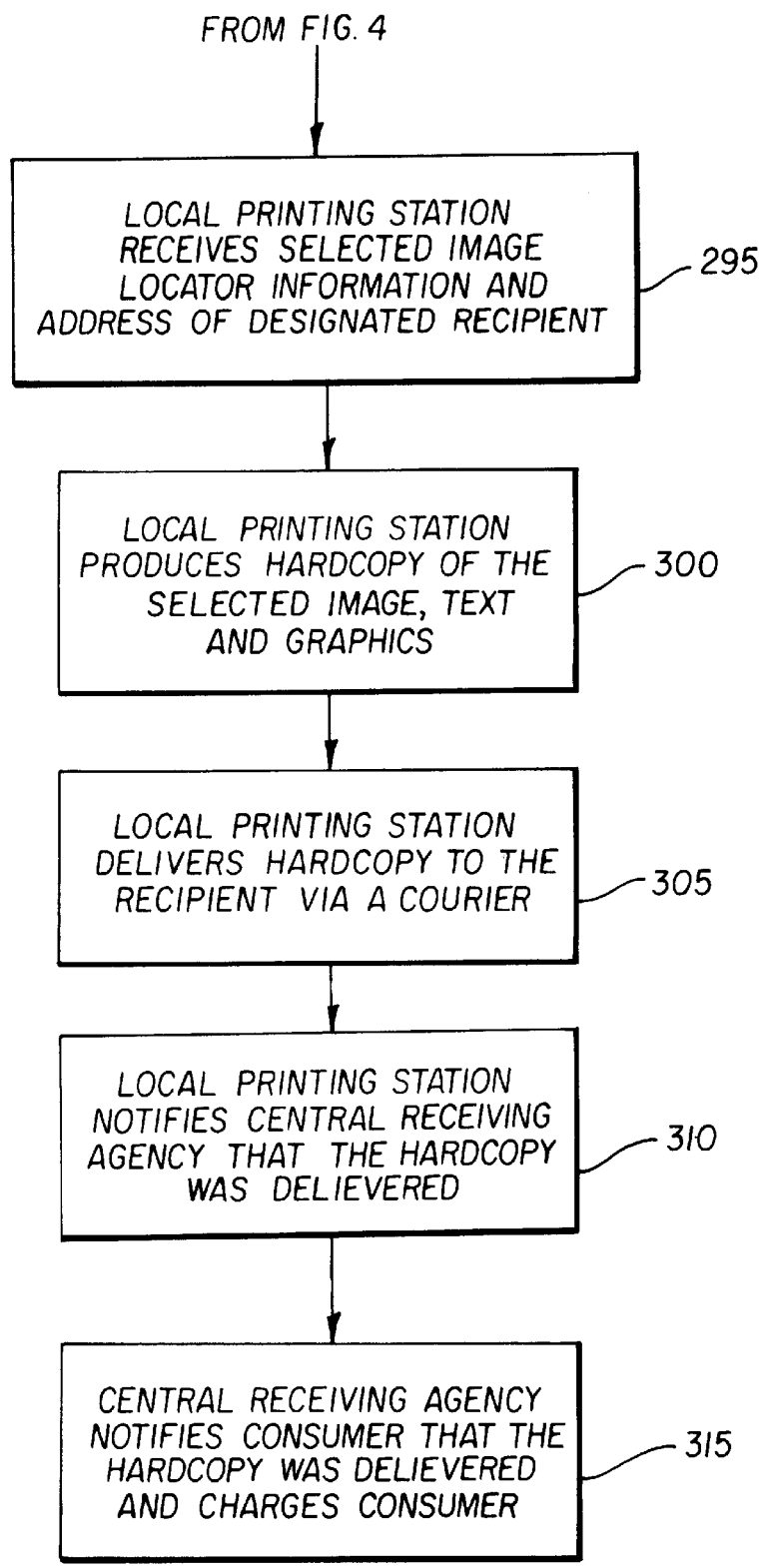
FIG. 5 is a flow chart continuing the flow chart of FIG. 4 showing how the selected image is received by the local printing station, a hardcopy is produced, delivered to the designated recipients, while the user or consumer is charged and notified of the delivery.

Now referring to FIG. 5, which flows from FIG. 4 and shows how the local printing station 120 closest to the designated recipient receives 295 the selected image 40 and associated text and graphics 129. The local printing station 120 prints 300 a hardcopy 126 of the selected image 40 and associated text and graphics 129, packages as designated by number 127 and delivers 305 the hardcopy 126 to the designated recipient. The local printing station 120 notifies 310 the central receiving agency 80 that the hardcopy 126 was delivered. The central receiving agency 80 notifies 315 the user or consumer that the hardcopy 126 was delivered and charges the user or consumer's credit card account.

It will be understood the present invention is not limited to the printing and delivery of images but is equally applicable to the printing and delivery of post cards, greeting cards, or the like.

The invention has been described in detail with particular reference to certain preferred embodiments thereof, but it will be understood that variations and modifications can be effected within the spirit and scope of the invention.

PARTS LIST
remote location
personal computer
personal images
selected images
film scanner
print scanner
display
modem
central receiving agency
communication channel
server
memory
monitor
modem
local printing station
image
hardcopy
packaged image
text and graphics
thermal printer
minilab
view selected images
consumer selects
fill out user or consumer order form
user or consumer order form
image locator
authorization code
decision block
text message
decision block
graphics locator information
transmission to central receiving agency
central receiving agency receives information
central receiving agency stores information
information displayed
image check
determine local printing station authorize printing
local printing station receives print
hardcopy produced
hardcopy delivered
central receiving agency notified
user or consumer notified and charged

What is claimed is:

1. A method of delivering printed images to a recipient, comprising the steps of:

a) electronically transmitting digital images and image locator information from a location remote from and over a communication channel to a central receiving agency which stores such images and locator information in memory;

b) the central receiving agency identifying a particular stored image in the memory using: said image locator information in the transmitting stage of step a) and corresponding to the particular stored image, the location of one or more recipients, and printing locations corresponding to each of the recipients;

c) transmitting the identified particular stored image in the memory to the printing location of each of the recipients wherein the electronically transmitting and the identifying steps a) and b) are performed simultaneously; and d) printing the image at the printing location of each of the recipients and delivering the printed image to the location corresponding to each of the recipients.

2. The method of claim 1 wherein the electronically transmitting step further includes transmitting signals having textual information to be printed on or with the selected image.

3. The method of claim 1 wherein the electronically transmitting step further includes transmitting signals having graphics information to be printed on or with the selected image.

4. The method of claim 1 wherein the recipient location information includes a distribution list originally resident in a personal computer or in a central server managed by the central receiving agency.

5. The method of claim 1 wherein the recipient location information includes the address of each of the recipients and wherein the printed image is delivered by mail to the address of each of the recipients.

* * * * *